(No Model)
M. A. WALKER.
FLOWER POT.
No. 584,433. Patented June 15, 1897.
Fig: 1.
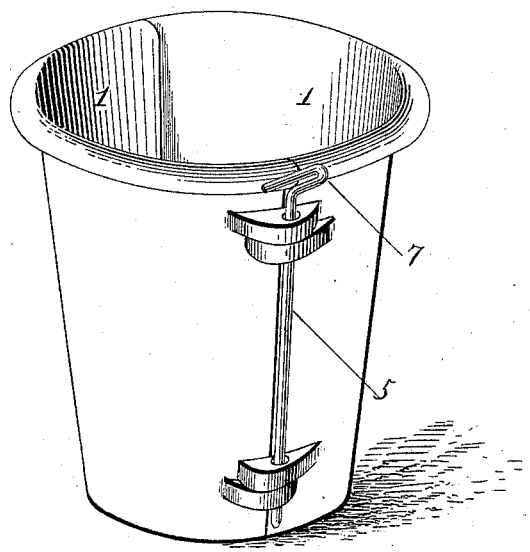
Fig: 2.
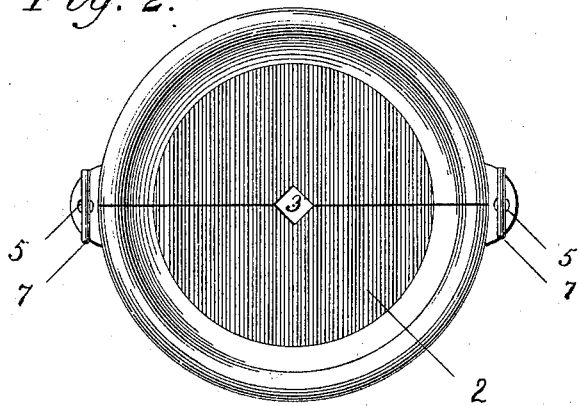
Fig: 3.
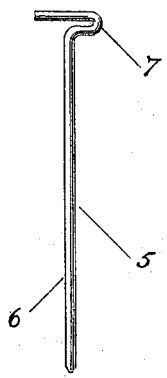
WITNESSES
W. C. McGowan
C. D. Iresler
INVENTOR
Martha A. Walker,
By John Wedderburn
Attorney

UNITED STATES PATENT OFFICE.

MARTHA A. WALKER, OF HUNTINGTON, WEST VIRGINIA.

FLOWER-POT.

SPECIFICATION forming part of Letters Patent No. 584,433, dated June 15, 1897.

Application filed January 9, 1897. Serial No. 618,605. (No model.)

*To all whom it may concern:*

Be it known that I, MARTHA A. WALKER, a citizen of the United States, residing at Huntington, in the county of Cabell and State of West Virginia, have invented certain new and useful Improvements in Flower-Pots; and I do hereby declare the following to be a full, clear, and exact description of the invention, such as will enable others skilled in the art to which it appertains to make and use the same.

This invention relates to flower-pots and articles of a similar nature and is designed to facilitate the extraction of the plant and earth from the pot for the purpose of transplanting the same.

The object of the present invention is to provide a sectional flower-pot in which the sections are securely held together when in use and adapted to be readily disassociated when it is desired to transplant the contents of the pot.

The invention consists in certain novel features and details of construction and arrangement of parts, as hereinafter fully described, illustrated in the drawings, and incorporated in the claim.

In the accompanying drawings, Figure 1 is a perspective view of a flower-pot constructed in acordance with the present invention. Fig. 2 is a plan view of the same. Fig. 3 is a detail view of one of the fasteners.

Similar numerals of reference designate corresponding parts in the several figures of the drawings.

The improved flower-pot contemplated in this invention comprises two equal and similar sections 1, meeting the diametrical line of the pot. These sections are brought together, forming a flower-pot of ordinary construction provided in its bottom 2 with an opening 3, formed by notching the meeting edges of the bottom of the sections at opposite points, as shown.

The sections 1 are provided at their sides and adjacent to their meeting edges with perforated ears, which extend laterally from the side of the pot and overlap each other, as clearly shown in the drawings. In other words, the ears on one section extend or lap over the meeting edge of the adjoining section, so that the perforations of said ears will be brought into alinement. The ears of one section are arranged to come between the ears of the other section, each section being provided with two ears at each side. By this arrangement the ears of the two sections are prevented from moving up or down relatively to each other, as the said ears form stops for preventing such movement. After the sections have been brought together in proper relation fasteners 5 are passed through the alining openings of the ears. Each of these fasteners consists of a piece of wire or a small rod 6, having one end bent to form either a T-shaped or L-shaped head 7 for facilitating the insertion and removal of the fastener with respect to the ears. When the fasteners are in place, the sections of the pot are securely connected, but by removing said fasteners the sections may be moved apart, thus allowing the plant or flower, together with the earth, to be removed without danger of disintegrating the compacted earth. This enables the flower to be transplanted without disturbing or in any wise injuring the roots or fibers.

A flower-pot constructed in accordance with the above description will be of great convenience and utility to gardeners in general, as well as flower-dealers.

The flower-pot may be constructed from potters' clay or any desired material in any size and in any shape.

Having thus described the invention, what is claimed as new, and desired to be secured by Letters Patent, is—

A flower-pot divided on a substantially diametrical line forming separable sections, the said sections being provided in their bottoms and adjacent to their meeting edges with opposing notches forming a drain-opening, in combination with means for detachably connecting said sections, substantially as described.

In testimony whereof I have signed this specification in the presence of two subscribing witnesses.

MARTHA A. WALKER.

Witnesses:
W. P. DONAHOE,
A. E. SALMON.